(12) United States Patent
Yung Ho

(10) Patent No.: US 7,263,996 B2
(45) Date of Patent: Sep. 4, 2007

(54) ANION EMISSION AND ANTI-DUST NOSE MASK

(76) Inventor: Kim Yung Ho, 106-1601, Inwangsan Hyundai Apt. Hongje 4-dong, Seodaemun-gu, Seoul 120-787 (KR)

( * ) Notice: Subject to any disclaimer, the term of this patent is extended or adjusted under 35 U.S.C. 154(b) by 0 days.

(21) Appl. No.: 10/562,386

(22) PCT Filed: Jul. 1, 2004

(86) PCT No.: PCT/KR2004/001608

§ 371 (c)(1),
(2), (4) Date: Dec. 27, 2005

(87) PCT Pub. No.: WO2005/002675

PCT Pub. Date: Jun. 13, 2005

(65) Prior Publication Data

US 2006/0150980 A1 Jul. 13, 2006

(30) Foreign Application Priority Data

Jul. 2, 2003 (KR) ...................... 20-2003-0021244

(51) Int. Cl.
*A61G 10/00* (2006.01)
*A61M 16/00* (2006.01)
*A62B 7/10* (2006.01)
*A62B 23/02* (2006.01)

(52) U.S. Cl. ............................ 128/206.11; 128/207.18; 128/206.16; 128/206.12; 128/206.18; 128/206.27; 128/207.13; 606/198; 606/199; 606/162

(58) Field of Classification Search ........... 128/206.11, 128/206.16, 207.18, 204.45, 206.12, 206.18, 128/206.27, 207.13, 204.11, 204.12, 204.13; 606/198, 199, 162; 239/36, 54, 56, 60; 248/206.5
See application file for complete search history.

(56) References Cited

U.S. PATENT DOCUMENTS

| 1,914,418 | A | * | 6/1933 | Garcia | .................... 128/206.18 |
| 2,251,139 | A | * | 7/1941 | Hurman | ................. 128/206.11 |
| 2,290,885 | A | * | 7/1942 | Lehmberg | .............. 128/206.15 |

(Continued)

FOREIGN PATENT DOCUMENTS

JP 09-294819 11/1997

(Continued)

OTHER PUBLICATIONS

Atlas Steels Australia, http://www.azom.com/details.asp?ArticleID=1140.*

Primary Examiner—Patricia Bianco
Assistant Examiner—Nihir Patel
(74) Attorney, Agent, or Firm—IPLA P.A.; James E. Bame

(57) ABSTRACT

The present invention relates to an anion emission and anti-dust nose mask capable of enhancing a compatibility so that it is well adapted to various sizes and types of nose based on its flexibility, and it is possible to wear without any string based on a pressure adjusting function, and the mask is not slid along a nose using a magnet, and nano filter, anion emission material receptacle, and anion emission material of the settling unit is added to a nose mask, thus achieving an anti-bacteria, deodorizing effect, and anion generation effect by the added material.

6 Claims, 3 Drawing Sheets

U.S. PATENT DOCUMENTS

| | | | |
|---|---|---|---|
| 5,372,130 A * | 12/1994 | Stern et al. | 128/205.25 |
| 6,395,046 B1 * | 5/2002 | Emig et al. | 55/382 |
| 2003/0106555 A1 * | 6/2003 | Tovey | 128/205.27 |
| 2004/0116019 A1 * | 6/2004 | Zucker et al. | 442/189 |
| 2004/0173216 A1 * | 9/2004 | Park | 128/206.12 |

FOREIGN PATENT DOCUMENTS

| | | |
|---|---|---|
| JP | 11-137701 | 5/1999 |
| KR | 20-290424 | 9/2002 |

* cited by examiner

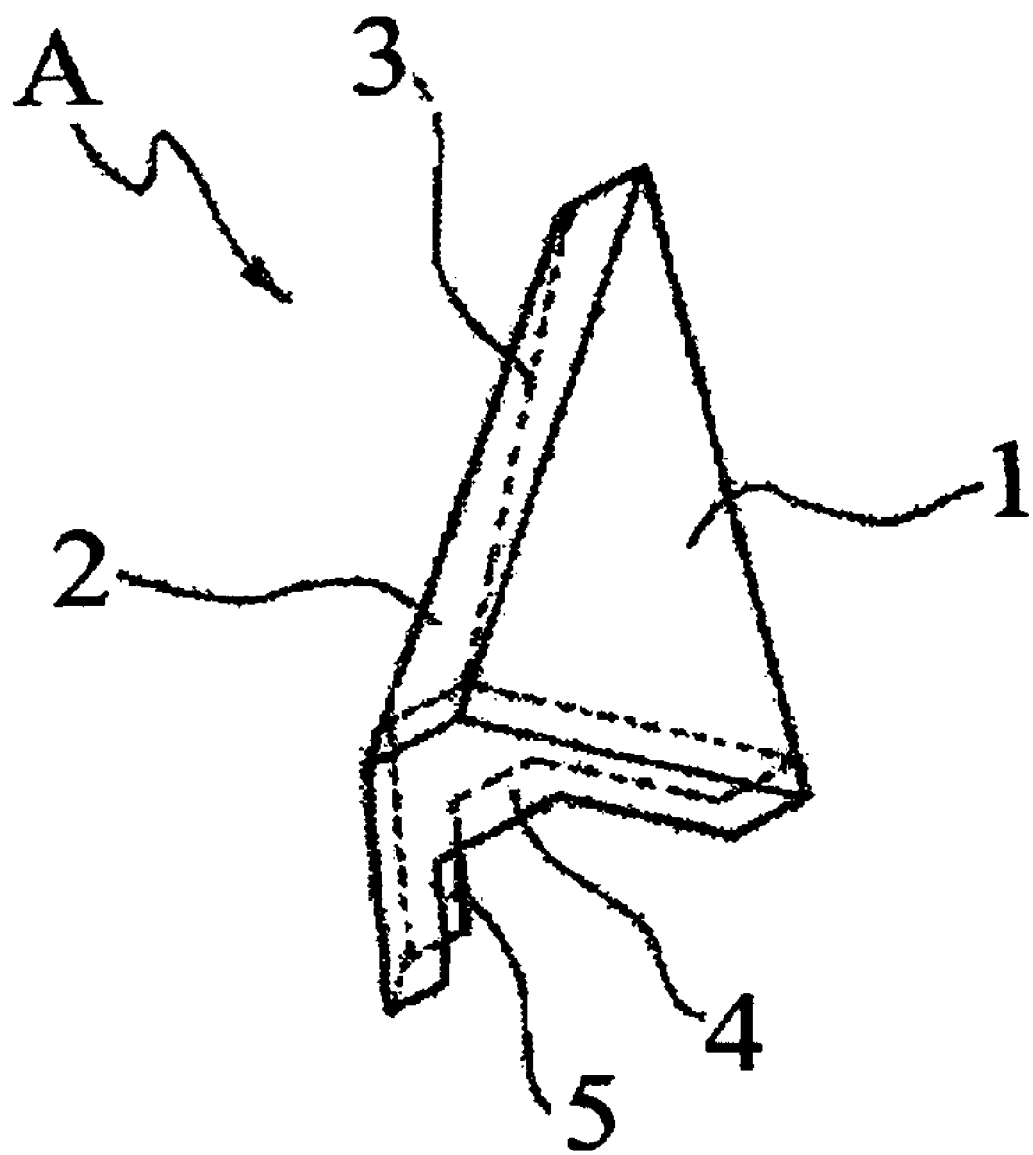
[Fig. 1]
Prior Art

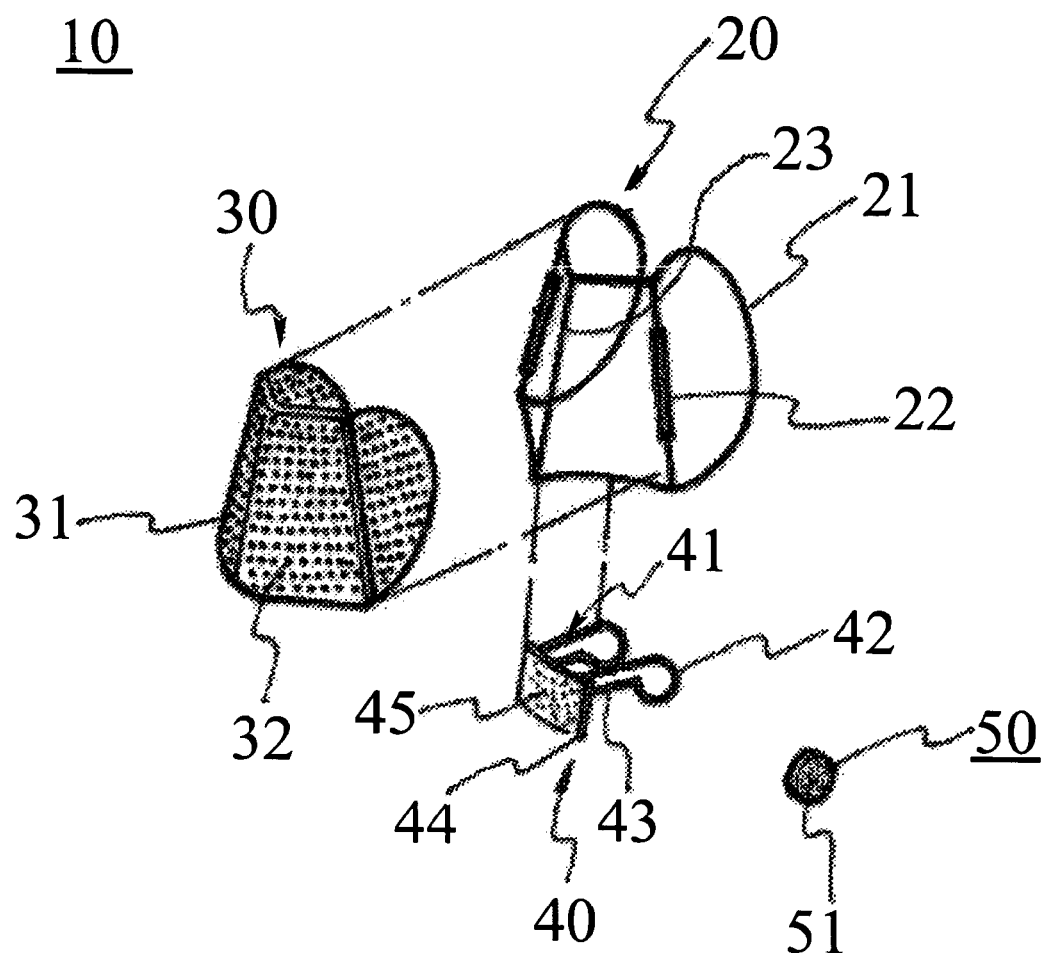
[Fig. 2]

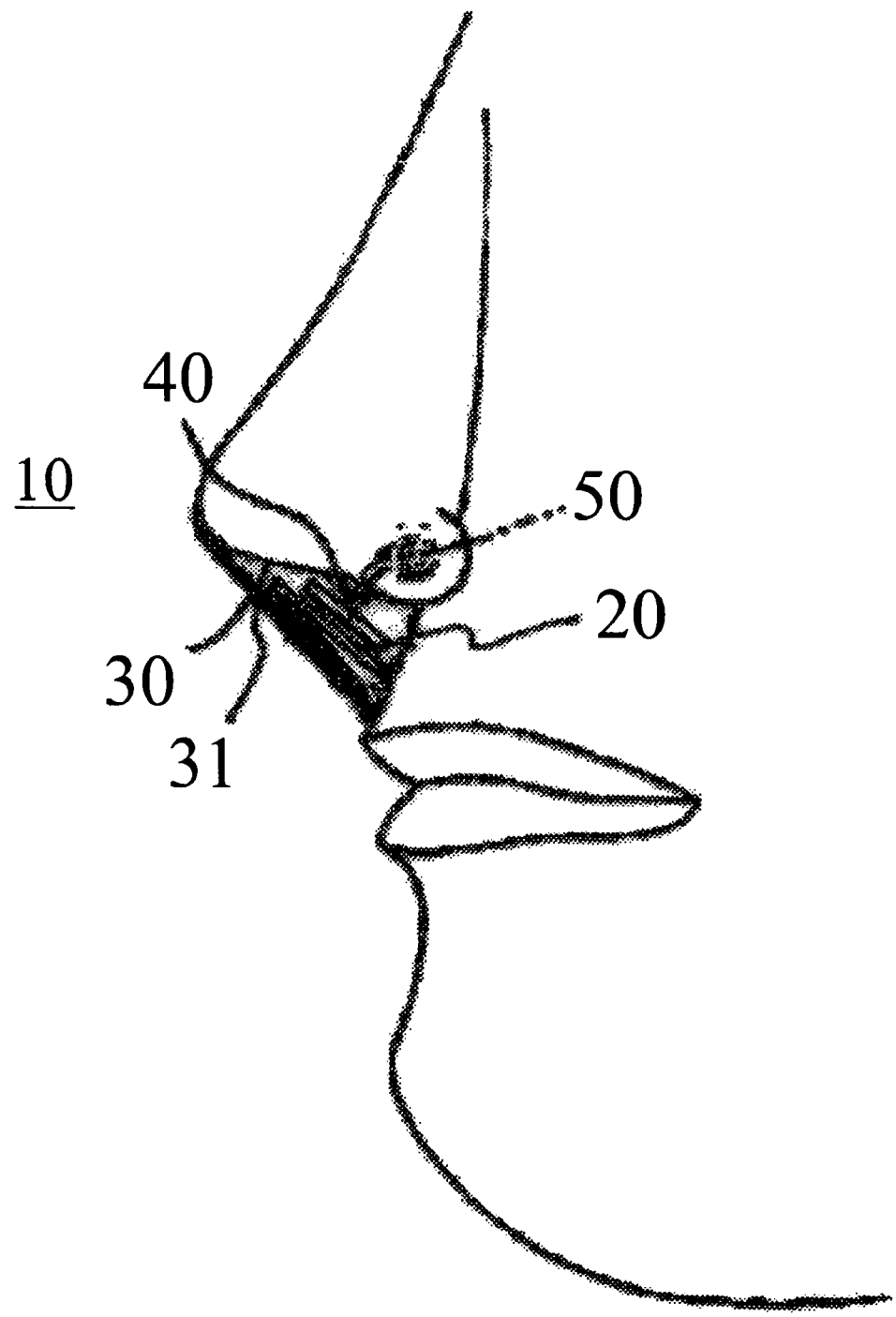
[Fig. 3]

ANION EMISSION AND ANTI-DUST NOSE MASK

TECHNICAL FIELD

The present invention relates to an anion emission and anti-dust nose mask capable of enhancing a compatibility so that it is well adapted to various sizes and types of nose based on its flexibility, and it is possible to wear without any string based on a pressure of a mask wing part, and the mask is not slid along a nose using a magnet, and a certain mineral, silver, tourmaline, etc. is added to a nose mask, thus achieving an anti-bacteria, deodorizing effect, and anion generation effect by the added material.

BACKGROUND ART

Generally, various kinds of masks capable of preventing harmful dusts such as pollen, yellow sands, bacteria, etc. from being inputted into a nose are used.

However, the conventional mask is fabricated in a certain uniform size without consideration of its look and has an attention from others. Therefore, people do not like to use it. As a mask engaging means, a hair band or an ear hung type string is generally used. But, there are problems in using the same. Namely, non-purified air is inputted through a gap of the mask. In addition, since the mask covers the mouth, it is impossible to talk with others.

According to the Korean utility model application No. 1999-0027719 (Title: nose mask with insertion groove for assistant material), the nose mask capable of overcoming the above problems has been developed.

FIG. 1 is a view of a conventional anti-dust nose mask. As shown therein, an outer construction is formed of four surfaces of a right surface 1, a front surface 2, a left surface 3 and a partially opened lower surface 4. A wall 5 parallel with the lower surface 4 is engaged in the inner space connected by the four surfaces. A groove is formed, so that a filter or a perfume is inserted therein.

However, in the nose mask A, since the mouth part is exposed, it is possible to talk, and it is possible to disconnect the gap of the surrounding edge. There are not any functions for adjusting flexibility and elasticity. Namely, a fixed structure is provided. It is impossible to adapt to various shapes and sizes of the users. The nose mask may be easily escaped from the nose based on the size of the nose. The nose mask A covers the entire portions of the nose, and the wearing feeling is not good. The look is also bad.

In addition, in the case that a certain adhesive band is used for preventing an escape of the nose mask A, an adhering force may be lost due to moisture, so that the nose mask A can be easily slid along the nose.

Furthermore, the conventional nose mask A does not any functions of anti-bacteria, deodorizing, and anion emission. Namely, there are only simple functions as a nose mask.

DISCLOSURE OF INVENTION

Technical Solution

Accordingly, it is an object of the present invention to provide a nose mask. The structure of a conventional nose mask is changed, and certain flexibility is provided. The nose mask according to the present invention can be well adapted to various sizes and types of noses for thereby enhancing compatibility. It is easy to wear the nose mask. A certain space is formed between a nose entrance and a nose mask, thus achieving an easier breathing. The nose mask is not slid along the nose using a tensing force of a nose mask based on a tension adjusting function. A sterilizing function is provided. The nose mask has an anion emission function.

In particular, the nose mask according to the present invention has functions such as anti-bacteria, deodorizing, anion emission, etc. using nano fiber, silver filter, and tourmaline, etc.

To achieve the above objects, in a nose mask, there is provided an anion emission and anti-dust nose mask, comprising a support frame that is installed between an end of a nose and an intermediate portion of an upper lip wherein both sides are bent about a center for thereby covering nose holes, and both ends of the same are bent in one direction and are closely contacted with a nose back wherein the support frame has wing parts; a filter part that is combined with the support frame and is formed of nano fiber for purifying air inputted through the nose and has fine holes and has a receiving pocket for storing a certain health assistant material such as silver fiber, tourmaline particle, etc.; and a settling unit that includes, so that the combined body of the support frame and the filter part is installed firmly in the nose, a semi-ring part that is inserted into the nose holes about the wall between the nose holes; an crook part that is downwardly bent in an oval shape from both ends of the semi-ring part and contacts with a lower side of the deep nose and is engaged thereby; a connection part that is extended from both ends of the crook part and is extended horizontally in the direction of the semi-ring part and is connected to groove part; and a groove part formed at both ends of the connection part in a rectangular shape; and a magnet that is attached to the groove part for fixing the support frame.

In addition, there is further provided an assistant receptacle for receiving tourmaline particle etc. therein, or tourmaline source stones or ceramic balls that is inserted into or attached to the crook part of the settling unit wherein it has fine holes on the surface of the same.

The wing part of the support frame is designed in such a manner that the wing part of both sides of the same is folded and has a hinge function for thereby enhancing a pressure adjusting function.

In the nose mask, the settling unit can be separated independently from the filter body (support frame and filter part), the settling unit is formed of silver, etc. wherein tourmaline is attached thereto.

DESCRIPTION OF DRAWINGS

The preferred embodiments of the present invention will be described with reference to the accompanying drawings.

FIG. 1 is a view of a conventional nose mask;

FIG. 2 is a perspective view of an anion emission and anti-dust nose mask according to the present invention; and FIG. 3 is a view of a state that an anion emission and anti-dust nose mask is worn to a nose of a user according to the present invention.

BEST MODE

The anion emission and anti-dust nose mask according to the present invention will be described with reference to the accompanying drawings. FIG. 2 is a perspective view of an anion emission and anti-dust nose mask according to the present invention, and FIG. 3 is a view of a state that an anion emission and anti-dust nose mask is worn to a nose of a user according to the present invention. As shown therein, the nose mask 10 is formed of a support frame 20, a filter part 30 and an settling unit 40.

The support frame 20 is adhered to a rim of the filter part 30 having a receiving pocket 31, and wing parts is properly bent, so that the filter part 30 is tightly contacted with a nose top with a certain pressure.

Here, the support frame 20 has a steel wire having flexibility adjustable by a certain pressure, and a steel wire 23 of the center part has an adhering function with a magnet of the settling part. The wing part 21 may be folded based on a function of a hinge 22 for enhancing a pressure adjusting function. The support frame 20 forms a rim with a certain size for thereby covering the nose, and the edges of the support frame 20 do not provide any gaps when wearing the nose mask.

The filter part 30 is formed of a nano fiber non-woven fabric. The receiving pocket 31 is inserted or attached thereto. The receiving pocket 31 has a plurality of fine holes 32 through which air passes. A health assistant material such as silver fiber filter and tourmaline and aroma perfume particle is inserted thereinto, thus achieving anti-bacteria, deodorizing and anion emission functions.

Here, the settling unit 40 is engaged with the support frame 20 and the filter part 30 and is installed in the nose. Here, the settling unit 40 includes a semi-ring part 41 inserted into nose holes about a wall between left and right nose holes, an crook part 42 that is curved in a downward oval shape from both ends of the semi-ring part 41 and contacts with a lower side of the deep part of the nose, a groove 44 that is formed from both ends of the crook part 42 in a square shape at both ends of the connection part 43, and a magnet 45 installed in the groove 44 for thereby fixing the magnet 45. The magnet 45 is detachable from the groove part.

There are provided tourmaline source stones or ceramic balls or an assistant receptacle 50 with the fine holes 51 in the crook part 42 of the settling unit 40. The assistant receptacle contains a health assistant material such as tourmaline particle.

When using the nose mask according to the present invention, in a state that the filter part 30 having the receiving pocket 31 is engaged to the support frame 20, it is supported by a nose back based on a pressure formed based on the bending of the wing part 21 of the support frame 20. At this time, the upper portion of the support frame 20 is positioned on the nose tip. The lower side of the same is positioned at the intermediate portion of the dimple of the upper lip.

In the present invention, since the support frame 20 has flexibility and pressure, the nose mask is not slid on the nose without the settling unit 40, thus achieving an easier wearing. When wearing the same, a certain space part is formed between the nose mask 10 and the nose entrance, thus achieving an easier breathing.

In particular, the combined body of the filter part 30 and the support frame 20 is stably attached by the steel wire 23 provided in the center of the support frame and the magnet 45 provided in the settling unit 40, thus achieving an easier use. Namely, the settling unit 40 is pushed and inserted into the nose holes, and the wall part between the left and right nose holes is inserted into the semi-ring part 41, and the crook part 42 contacts with the lower side of the nose hole. The magnet inserted into the groove 44 is closely contacted with the intermediate portion of the upper lip, so that the settling unit 40 maintains a horizontal state, and the fixing force of the support frame 20 of the filter part is enhanced.

When the settling unit 40 is inserted into the nose hole, the lower side of the receiving pocket 30 is positioned at the intermediate portion of the upper lip, and the upper side is positioned at the nose tip. The wing part 21 is closely contacted with the both side surface of the nose back by the pressure. In addition, a space part is formed between the nose entrance and the filter part 30 as shown in FIG. 3.

In the present invention, in the case of a hard exercise, it is possible to prevent the combined body of the support frame 20 and the filter part 30 from being slid along the nose by vibrations. In addition, the settling unit 40 is inserted into the nose and the majority of unit is not exposed to the outside. It is formed in a wire form for thereby decreasing the friction in the inner side of the nose. Therefore, it is possible to use without any pain. The settling unit is formed of silver, thus enhancing an anti-bacteria function. Tourmaline may be attached thereto, so that it is possible to achieve an anion emission effect. In a state before the filter part and the magnet are engaged, it is possible to use it as an independent device having anti-bacteria and anion effects.

In the present invention, it is possible to achieve good effects by health assistant materials such as silver fiber filter, tourmaline and aroma perfume particles stored in the receiving pocket 30 and the assistant receptacle 50. The performance of the same is excellent. Since the health assistant materials are known as having good functions for health, the detail description thereof will be omitted.

INDUSTRIAL APPLICABILITY

As described above, in the present invention, it is possible to achieve a compatibility that the nose mask according to the present invention can be well adapted to various sizes and types of noses based on the support frame having flexibility. A certain pressure is provided, and the strength of the same is controlled. A stable adhering force is enhanced based on the wing part. A certain space is provided in the entrance part of the nose, so that an easier breathing is obtained. In addition, the functions such as anti-bacteria, deodorizing, anion emission function, etc. are obtained based on the materials added for the functions.

As the present invention may be embodied in several forms without departing from the spirit or essential characteristics thereof, it should also be understood that the above-described examples are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

The invention claimed is:

1. In a nose mask, an anion emission and anti-dust nose mask, comprising:

a support frame that is installed between an end of a nose and an intermediate portion of an upper lip wherein both sides are bent about a center for thereby covering nose holes, and both ends of the same are bent in one direction and are closely contacted with a nose, wherein the support frame comprises a wing part provided on both sides of the support frame, and wherein the support frame comprises wire;

a filter part that is combined with the support frame and for purifying air inhaled through the nose and has a receiving pocket with fine holes, the receiving pocket storing a health assistant material; and a settling unit, so that the combined body of the support frame and the filter part are installed firmly in the nose, comprising
- a semi-ring part that is inserted into the nose holes about the wall between the nose holes;
- a crook part that is downwardly bent in an oval shape from both ends of the semi-ring part and contacts with a lower side of the deep nose and is engaged thereby;
- a connection part that is extended from both ends of the crook part and is extended horizontally in the direction of the semi-ring part;
- a groove part formed in a rectangular shape at both ends of the connection part; and
- a magnet that is attached to the groove part for fixing the support frame.

2. The mask of claim 1, further comprising an assistant receptacle with fine holes on the surface, wherein the assistant receptacle comprises at least one of tourmaline source stones and tourmaline ceramic balls, and wherein the assistant receptacle is inserted into or attached to the crook part of the settling unit.

3. The mask of claim 1, wherein said wing part of the support frame is designed in such a manner that the wing part is folded and has a hinge function for thereby enhancing a pressure adjusting function.

4. The mask of claim 1, wherein the settling unit is separated independently from the support frame and the filter part.

5. The mask of claim 1, wherein the filter part is formed of nano fiber.

6. The mask of claim 1, wherein the health assistant material comprises silver fiber and tourmaline particle.

* * * * *